United States Patent

Furukawa et al.

[11] Patent Number: 6,060,221
[45] Date of Patent: *May 9, 2000

[54] METHOD AND APPARATUS FOR INITIALIZING OPTICAL RECORDING MEDIUM

[75] Inventors: Shigeaki Furukawa; Katsumi Kawahara; Noboru Yamada; Kenichi Nishiuchi, all of Osaka, Japan

[73] Assignee: Matsushita Electric Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/800,609

[22] Filed: Feb. 14, 1997

[30] Foreign Application Priority Data

Feb. 16, 1996 [JP] Japan .................................... 8-029608

[51] Int. Cl.⁷ ...................................................... G11B 7/24
[52] U.S. Cl. .................... 430/321; 430/270.13; 369/100; 369/116; 369/121; 369/275.4
[58] Field of Search ..................................... 430/321, 395, 430/270.13; 369/100, 121, 116, 284, 275.4

[56] References Cited

U.S. PATENT DOCUMENTS

| 3,964,910 | 6/1976 | Geist et al. ............................... 430/395 |
| 4,293,633 | 10/1981 | Huffey et al. ............................ 430/395 |
| 5,684,778 | 11/1997 | Yamada et al. ..................... 430/270.13 |

FOREIGN PATENT DOCUMENTS

| 61-220150 | 9/1986 | Japan ................................... 369/275.4 |
| 62-121942 | 6/1987 | Japan ................................... 369/275.4 |
| 62-164240 | 7/1987 | Japan ................................... 369/275.4 |
| 62-250533 | 10/1987 | Japan . |
| 63-261553 | 10/1988 | Japan . |
| 1-102754 | 4/1989 | Japan . |
| 1-122043 | 5/1989 | Japan . |
| 1-300439 | 12/1989 | Japan . |
| 2-3217 | 1/1990 | Japan . |
| 4-271019 | 9/1992 | Japan . |

OTHER PUBLICATIONS van der Grinten, "A History of Reflex Copying . . . " The Photographic Journal pp 579–583 & 586, Sep. 1938.

*Primary Examiner*—Martin Angebranndt
*Attorney, Agent, or Firm*—Merchant & Gould P.C.

[57] ABSTRACT

In a method and an apparatus initializing an optical recording medium by irradiating a flash light. Walls are formed on a holder for holding the optical recording medium so as to adjoin an inner edge and an outer edge of the optical recording medium. When a flash light irradiates, a part of incident light which obliquely enters into an inner and an outer periphery regions of the optical recording medium is shaded by the walls. A quantity of the incident light incident on a unit area in each of the inner and outer periphery regions is less than that in a recording region between the inner and outer periphery regions. When temperature in the recording region reaches to an initializing temperature, the temperature in each of the inner and outer periphery regions is lower than the initializing temperature. So that neither cracks nor corrugations occur in a recording layer in the inner and outer regions.

14 Claims, 11 Drawing Sheets

METHOD AND APPARATUS FOR INITIALIZING OPTICAL RECORDING MEDIUM

FIELD OF THE INVENTION

This invention relates to a method and an apparatus for initializing an optical recording medium having a recording layer in which an optical characteristic of the recording layer is changeable by irradiation of light beams.

DESCRIPTION OF THE PRIOR ART

An optical recording medium includes a phase transformation optical recording medium and a magneto-optical recording medium. A flash lamp is conventionally irradiated on a surface of the optical recording medium for initializing a recording layer in the optical recording medium. By the irradiation of the flash lamp, the recording layer in the optical recording medium can be initialized entirely. The initialization of the recording layer in the optical recording medium needs about 1 to 2 ms.

In the phase transformation optical recording medium, data is generally recorded by transforming the phase of each recording bit of the recording layer from crystalline state to amorphous state. Thus, the initialization signifies the transformation of the whole recording region on the recording layer to be the crystalline state prior to the recording of the data. On the other hand, in the magneto-optical recording medium, the initialization signifies an arrangement of magnetization of the recording layer in the same direction prior to the recording of the data.

When the optical recording medium has a disc shape with a center chuck hole and the recording layer of the optical recording medium is entirely initialized by the flash lamp, cracks and/or corrugations will occur in the recording layer in an outer peripheral region and an inner peripheral region of the optical recording medium. The reason why the cracks and the corrugations occur is as follows:

When the flash lamp irradiates the surface of the optical recording medium, the incident light beams reach to the recording layer in the optical recording medium. The recording layer absorbs the incident light beams and converts the luminous energy of the incident light beams to a thermal energy. Thus, the temperature of the recording layer in the optical recording medium suddenly increases. Generally, a reflection layer, which is made of metal material, is provided on the recording layer. The thermal conductivity of materials of the recording layer and the reflection layer is higher than that of materials of a substrate and a protection layer. Thus, heat generated in the recording layer radiates to the circumference through the recording layer and the reflection layer.

The recording layer and the reflection layer, however, do not exist in a portion corresponding to the center chuck hole and in a portion outside the optical recording medium. Thus, radiation of heat in the inner peripheral region and the outer peripheral region of the optical recording medium is less than radiation of heat in a middle region between the inner peripheral region and the outer peripheral region. As a result, the temperature in the inner peripheral region and the outer peripheral region becomes higher than the temperature in the middle region. Since the thermal load in the inner peripheral region and the outer peripheral region is greater, cracks and corrugations occur in the recording layer, the reflection layer and so on in these regions. The cracks and the corrugations will cause not only a malfunction in a recording or reproducing operation of the data, but will also cause an intrusion of water or impurities into the recording layer. The optical recording medium will be damaged.

For preventing the occurrence of cracks and corrugations in the recording layer, a conventional apparatus for initializing an optical recording medium is disclosed, for example, in the Publication Gazette of Japanese Unexamined Patent Application Hei 1-300439. In the conventional apparatus, a recording layer in an inner peripheral region and an outer peripheral region of the optical recording medium is not initialized. The conventional apparatus is described with reference to FIG. 10.

In the conventional apparatus shown in FIG. 10, a disc shaped optical recording medium 1 is disposed on a table 80, and a ring shaped-mask 81 and a circular mask 82 are disposed on the optical recording medium 1. When a flash of light is irradiated from a flash lamp 4, the masks 81 and 82 shield incident light beams from illuminating an inner peripheral region and an outer peripheral region of the optical recording medium 1. Thus, a recording layer in the inner peripheral region and the outer peripheral region of the optical recording medium is not initialized, and temperature in these regions does not increase as much. Thus, the occurrence of cracks and corrugations in the recording layer in the inner peripheral region and the outer peripheral region can be reduced.

With respect to the inner peripheral region of the optical recording medium, the end of a recording region in which data Is actually recorded is distant from the edge of the center chuck hole. In other words, the width of the inner peripheral region of the optical recording medium is relatively wide, while leaving enough space for the recording region. Thus, the circular mask 82 can be omitted, if the occurrence of cracks and corrugations in the recording layer in the inner peripheral region of the optical recording medium is sufficiently small to be acceptable.

However, in the initializing operation of the optical recording medium of the conventional apparatus shown in FIG. 10, the masks 81 and 82 must be precisely positioned on the optical recording medium 1. The positioning of the masks 81 and 82 on the optical recording medium 1 is difficult and needs a long time. Especially, when a lot of the optical recording media are initialized in a mass production process, this conventional apparatus causes a reduction of production efficiency or productivity.

SUMMARY OF THE INVENTION

An objective of this invention is to provide a method and an apparatus for initializing an optical recording medium except at least an outer peripheral region thereof in order to minimize the occurrence of cracks and corrugations in the recording layer in the outer peripheral region by a simple operation. Another objective of this invention is to simplify the positioning of the optical recording medium on the apparatus.

A method for initializing an optical recording medium of this invention initializes a recording layer of the optical recording medium in which an optical characteristic of the recording layer is changeable by the irradiation of light. A luminous energy adjuster is provided on a holder for holding the optical recording medium. When a flash lamp irradiates a surface of the optical recording medium, the luminous energy adjuster reduces a quantity of incident light due to the flash lamp incident on a unit area of a first region disposed adjacent to an outer edge of the optical recording medium less than a quantity of incident light incident on a unit area of a second region disposed inside the first region. Hereupon, the "quantity of incident light" is defined as a time quadrature of energy due to the incident light beams.

The recording layer in the second region is entirely initialized by irradiation of the flash lamp, since luminous energy due to the incident light is sufficient to change the optical characteristic of the recording layer in the second region. However, most of the recording layer in the first region is not initialized, since the luminous energy due to the incident light or the quantity of the incident light incident on the unit area in the first region is not sufficient to change the optical characteristic of the recording layer in the first region.

In other words, by reducing the luminous energy or the quantity of the incident light incident on the unit area of the recording layer in the first region, a temperature rise in the recording layer, a reflection layer, a protection layer, etc., (hereinafter abbreviated as the recording layer) in the first region is made smaller than that in the second region when the recording layer in the second region is initialized. As a result, the occurrence of cracks and corrugations in the recording layer in the first region is minimized. Furthermore, there is no need to position a mask on the surface of the optical recording medium for shielding the incident light irradiating the first region on the optical recording medium, so that the time for initializing the optical recording medium is shortened by the time necessary for positioning the mask in the conventional method.

In the above-mentioned method, the luminous energy adjuster includes a wall protruding toward a light source of the flash lamp, having a height higher than a thickness of the optical recording medium, and provided along the outer edge of the optical recording medium held on the holder. By the existence of the wall, a part of the incident light beams obliquely irradiating the first region is shaded. Thus, the quantity of the incident light incident on the unit area of the recording layer in the first region is smaller than that in the second region. The temperature rise in the recording layer in the first region of the optical recording medium is smaller, so that the occurrence of cracks and corrugations in the recording layer is minimized. Furthermore, the wall serves as a guide member when the optical recording medium is mounted on the holder, so that the positioning operation of the optical recording medium on the holder is made much easier.

Alternatively, in the above-mentioned method, the luminous energy adjuster includes a first and a second portions respectively having first and second reflectances formed on a surface of the holder on which the optical recording medium is mounted. The second reflectance of the second portion facing the second region of the optical recording medium is higher than that of the first portion facing at least the first region of the optical recording medium. By such a configuration, a quantity of the incident light due to the light, which is reflected by the surface of the holder and re-enters into the unit area of the recording layer in the second region of the optical recording medium, is greater than that in the first region of the optical recording medium. The temperature rise in the recording layer in the first region of the optical recording medium is smaller, so that the occurrence of cracks and corrugations in the recording layer in the first region of the optical recording medium is minimized. Furthermore, the second portion having a higher reflectance of the surface of the holder serves as a mark when the optical recording medium is mounted on the holder, so that the positioning operation of the optical recording medium on the holder is made relatively easier.

Alternatively, in the above-mentioned method, the luminous energy adjuster includes a hollow formed in at least a first portion of the surface of the holder facing the first region of the optical recording medium. By such a configuration, most of the incident light which enters into and passes through the first region of the optical recording medium becomes stray light in the hollow and is absorbed by surfaces of the hollow. Thus, the quantity of the light which is reflected by the surface of the hollow and re-enters into the unit area of the recording layer in the first region of the optical recording medium, is much less than the quantity of the light which is reflected by the surface of the holder and re-enters into the unit area of the recording layer in the second region of the optical recording medium. The temperature rise in the recording layer in the first region of the optical recording medium is made smaller, so that the occurrence of cracks and corrugations in the recording layer in the first region of the optical recording medium is minimized. Furthermore, the hollow on the surface of the holder serves as a mark when the optical recording medium is mounted on the holder, so that the positioning operation of the optical recording medium on the holder is made relatively easier.

In the above-mentioned method, the luminous energy adjuster further reduces a quantity of incident light due to the flash lamp incident on a unit area of the recording layer in a third region adjacent to an inner edge of the optical recording medium to be less than that in the second region. By such a configuration, the occurrence of cracks and corrugations in the recording layer in both of the first region and the third region of the optical recording medium is minimized.

The wall on the holder is further provided along an inner edge of the optical recording medium. Alternatively, a third reflectance of a third portion of the surface of the holder facing the third region of the optical recording medium is less than that of the second portion facing the second region of the optical recording medium. Alternatively, the third portion of the surface of the holder facing the third region of the optical recording medium is further hollowed. By such configurations, the quantity of the incident light incident on the unit area of the recording layer in the third region is made less than that in the second region of the optical recording medium. The temperature rise in the recording layer in the third region of the optical recording medium is made smaller, so that the occurrence of cracks and corrugations in the recording layer in the third region of the optical recording medium is minimized.

On the other hand, an apparatus for initializing an optical recording medium of this invention initializes a recording layer of the optical recording medium having an optical characteristic of each recording bit of the recording layer which is changeable by irradiation of light beams. The apparatus of this invention comprises a holder for holding the optical recording medium on its surface, a luminous energy adjuster provided on the holder for reducing a quantity of incident light incident on a unit area of the recording layer in a first region adjacent to an outer edge of the optical recording medium to be less than that in a second region disposed inside the first region, and a light source for irradiating the flash lamp to the entire surface of the optical recording medium held on the holder.

When the flash lamp irradiates, the luminous energy adjuster reduces the luminous energy due to the incident light or the quantity of the incident light incident on the unit area of the recording layer in the first region of the optical recording medium to be less than that in the second region. The recording layer in the second region is entirely initialized by irradiation of the flash lamp, since the luminous energy due to the incident light is sufficient to change the optical characteristic of the recording layer in the second region. However, most of the recording layer in the first region is not initialized, since the luminous energy due to the incident light or the quantity of the incident light incident on the unit area in the first region is not sufficient to change the optical characteristic of the recording layer in the first region.

By reducing the luminous energy or the quantity of the incident light incident on the unit area of the recording layer in the first region, a temperature rise in the recording layer in the first region is made smaller than that in the second region when the recording layer in the second region is initialized. As a result, the occurrence of cracks and corrugations in the recording layer in the first region is minimized. Furthermore, there is no need to position a mask on the surface of the optical recording medium for shielding the incident light irradiating the first region on the optical recording medium, so that the time for initializing the optical recording medium is shortened by the time necessary for positioning the mask using the conventional method.

In the above-mentioned apparatus, the light source of the flash lamp is disposed facing the surface of the optical recording medium held on the holder and has an irradiation area wider than the surface of the optical recording medium. By such a configuration, the flash lamp is evenly irradiated on at least the second region of the optical recording medium which is to be initialized.

Furthermore, the luminous energy adjuster includes a wall protruding toward the light source of the flash lamp, having a height higher than the thickness of the optical recording medium, and provided along the outer edge of the optical recording medium held on the holder. By the existence of the wall, a part of the incident light obliquely irradiating the first region is shaded. Thus, the quantity of the incident light entering into the unit area of the recording layer in the first region is less than that in the second region. The temperature rise in the recording layer in the first region of the optical recording medium is smaller, so that the occurrence of cracks and corrugations in the recording layer can be prevented. Furthermore, the wall serves as a guide member when the optical recording medium is mounted on the holder, so that the positioning operation of the optical recording medium on the holder is made much easier.

Furthermore, the luminous energy adjuster includes a height adjusting mechanism for adjusting the height of the wall. In that regard, the luminous energy adjuster comprises a tube shaped frame and a table which engages with an inner periphery of the frame and is movable along a center axis of the frame. By adjusting the height of the wall of the luminous energy adjuster, an area of the first region, where the incident light obliquely entering into is shaded by the wall, can be controlled. As a result, various kinds of optical recording media having different thickness, configuration, etc., can be initialized by the same apparatus. Alternatively, the height of the wall can be adjusted after mounting the optical recording medium on the holder, the first region of the optical recording medium where the occurrence of cracks and corrugations in the recording layer is minimized and the second regions of the optical recording medium where the recording layer is to be initialized can precisely be distinguished.

Alternatively, the luminous energy adjuster comprises a flat table and a frame disposed on the table and has an inner periphery engaged with the outer edge of the optical recording medium. The height of the frame is higher than the thickness of the optical recording medium. By such a configuration, the frame can be positioned at an optional position on the flat table, and the optical recording medium can easily be positioned on the table by using the frame as a guide member. Furthermore, when the size of the table and the irradiation area of the light source of the flash lamp are made much larger than the area of the optical recording medium, several optical recording media can be initialized at the same time.

In the above-mentioned configurations, when the height of the wall is "d", the height from the surface of the table to the recording layer in the optical recording medium is "h", the distance from the center to the outer edge of the optical recording medium is "A", and the distance from the center to an outer end of the second region to be initialized of the optical recording medium is "a", it is preferable to satisfy the formula of $d \geq h+(A-a)$.

By satisfying the above-mentioned condition, the initialized optical recording medium having an initialized region or the second region sufficient to record the data and an outer peripheral region or the first region where neither crack nor corrugation can be observed in the recording layer is obtained.

Alternatively, in the above-mentioned apparatus of this invention, the luminous energy adjuster includes a first and a second portions respectively having a first and a second reflectances formed on a surface of the holder on which the optical recording medium is mounted. The second reflectance of the second portion facing the second region of the optical recording medium is higher than that of the first portion facing at least the first region of the optical recording medium. In this regard, it is preferable that the second portion of the surface of the holder facing the second region of the optical recording medium is mirror finished, and the first portion of the surface of the holder facing the first region of the optical recording medium is black finished or rough finished.

By such a configuration, a quantity of the incident light which is reflected by the surface of the holder and re-enters into the unit area of the recording layer in the second region of the optical recording medium is greater than that in the first region of the optical recording medium. Since the temperature rise in the recording layer in the first region of the optical recording medium is smaller, the occurrence of cracks and corrugations in the recording layer is minimized. Furthermore, the mirror finished portion having a higher reflectance of the surface of the holder serves as a mark when the optical recording medium is mounted on the holder, so that the positioning operation of the optical recording medium on the holder is made relatively easier.

Alternatively, in the above-mentioned apparatus, the luminous energy adjuster includes a hollow formed in at least a first portion of the surface of the holder facing the first region of the optical recording medium. In this regard, it is preferable that the second portion of the surface of the holder facing the second region of the optical recording medium is mirror finished. Still furthermore, it is preferable that inner surfaces of the hollow be black finished or rough finished.

By such a configuration, most of the incident light which enters into and passes through the first region of the optical recording medium becomes stray light in the hollow and is absorbed by surfaces of the hollow. On the other hand, most of the incident light which enters into and passes through the second region of the optical recording medium is reflected by the surface of the holder and re-enters into the recording layer in the second region of the optical recording medium. Thus, the quantity of the light, which is reflected by the surface of the hollow and re-enters into the unit area of the recording layer in first region of the optical recording medium, is much smaller than the quantity of the light due to the light which is reflected by the surface of the holder and re-enters into the unit area of the recording layer in the second region of the optical recording medium. The temperature rise in the recording layer in the first region of the optical recording medium is made smaller when the recording layer in the second region of the optical recording medium is initialized, so that the occurrence of cracks and corrugations in the recording layer in the first region of the optical recording medium is minimized. Furthermore, the hollow on the surface of the holder serves as a mark when the optical recording medium is mounted on the holder, so that the positioning operation of the optical recording medium on the holder is made relatively easier.

In the above-mentioned apparatus, the luminous energy adjuster further reduces a quantity of incident light entering into a unit area of a third region adjacent to an inner edge of the optical recording medium to be less than that of the second region. By such a configuration, the occurrence of cracks and corrugations in the recording layer in both the first region and the third region of the optical recording medium is minimized.

The adjuster includes walls provided on the holder and along an inner edge and an outer edge of the optical recording medium. The heights of the walls are higher than the thickness of the optical recording medium. The luminous energy adjuster further includes height adjusting mechanisms for adjusting the heights of the walls in which the height of the wall provided along the inner edge of the optical recording medium is adjusted independently from the adjustment of the height of the wall provided along the outer edge of the optical recording medium.

In this regard, the luminous energy adjuster comprises a tube shaped frame, a boss disposed at the center of the tube shaped frame and a table which engages with an inner periphery of the frame and an outer periphery of the boss and movable along the boss.

Alternatively, the luminous energy adjuster comprises a flat table, a frame disposed on the table and having an inner periphery engaged with the outer edge of the optical recording medium, and a boss disposed at the center of the frame. The heights of the frame and the boss are higher than the thickness of the optical recording medium.

Furthermore, when the height of the wall is "d", the height from the surface of the table to the recording layer in the optical recording medium is "h", the distance from the center to the outer edge of the optical recording medium is "A", and the distance from the center to an outer end of the second region to be initialized of the optical recording medium is "a", it Is preferable to satisfy the formula of $d \geq h+(A-a)$.

Alternatively, the luminous energy adjuster includes a first, second and third portions respectively having first, second and third reflectances formed on a surface of the holder on which the optical recording medium is mounted. The second reflectance of the second portion facing the second region of the optical recording medium is higher than that of the first and third portions facing at least the first region and the third region of the optical recording medium. In this regard, it is preferable that the second portion of the surface of the holder facing second region of the optical recording medium is mirror finished, and the first and third portions of the surface of the holder facing the first region and third region of the optical recording medium is black finished or rough finished.

Alternatively, the luminous energy adjuster includes hollows formed in at least portions of the surface of the holder facing the first region and the third region of the optical recording medium. In this regard, it is preferable that the portion of the surface of the holder facing the second region of the optical recording medium is mirror finished. Still furthermore, it is preferable that inner surfaces of the hollows are black finished or rough finished.

DETAILED DESCRIPTION OF THE EMBODIMENTS

FIRST EMBODIMENT

A first embodiment of a method and an apparatus for initializing an optical recording medium of this invention is described with reference to FIGS. 1, 2(a) to 2(b), and 3(a) to 3(d).

Figure 1:
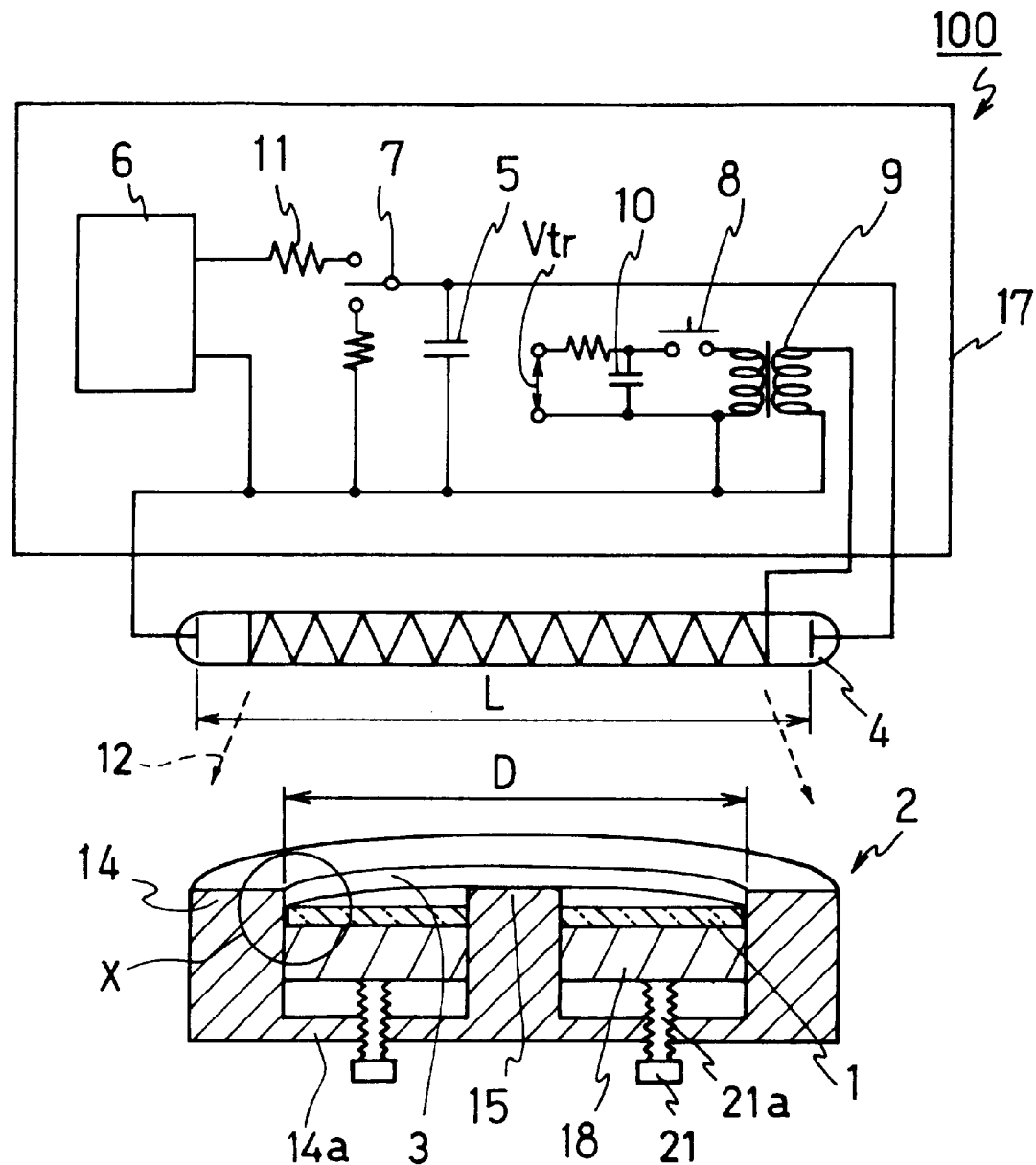
FIG. 1 is a partial cross-sectional and schematic illustration showing a configuration of a first embodiment of an apparatus for initializing an optical recording medium of this invention.

As can be seen from FIG. 1, a holder 2 comprises a tube shaped frame 14, a column shaped boss 15 disposed on a center axis of the frame 14, a ring shaped table 18 engaged with a ring shaped hollow 3 formed between the frame 14 and the boss 15 and movable along the center axis of the frame 14, and a height adjusting mechanism 21 for adjusting the depth of the hollow 3 or the heights of the frame 14 and the boss 15 relative to the table 18. As discussed hereafter, the boss 15 and the frame 14, coupled with the movable table 18 comprise a luminous energy adjuster. The height adjusting mechanism 21 is configured by a plurality of sets of female screw holes formed on the bottom 14a of the frame 14 and male screws 21a engaged with the female screw holes.

Many kinds of materials are appropriate for holder 2, such as, Metals, resins, etc. Specifically, one selected from among a stainless steel, a carbon steel, copper, a copper alloy, brass, aluminum, an aluminum alloy, etc., is suitable because these materials are stable against deformation of shape and are weatherproof.

Figure 2A:
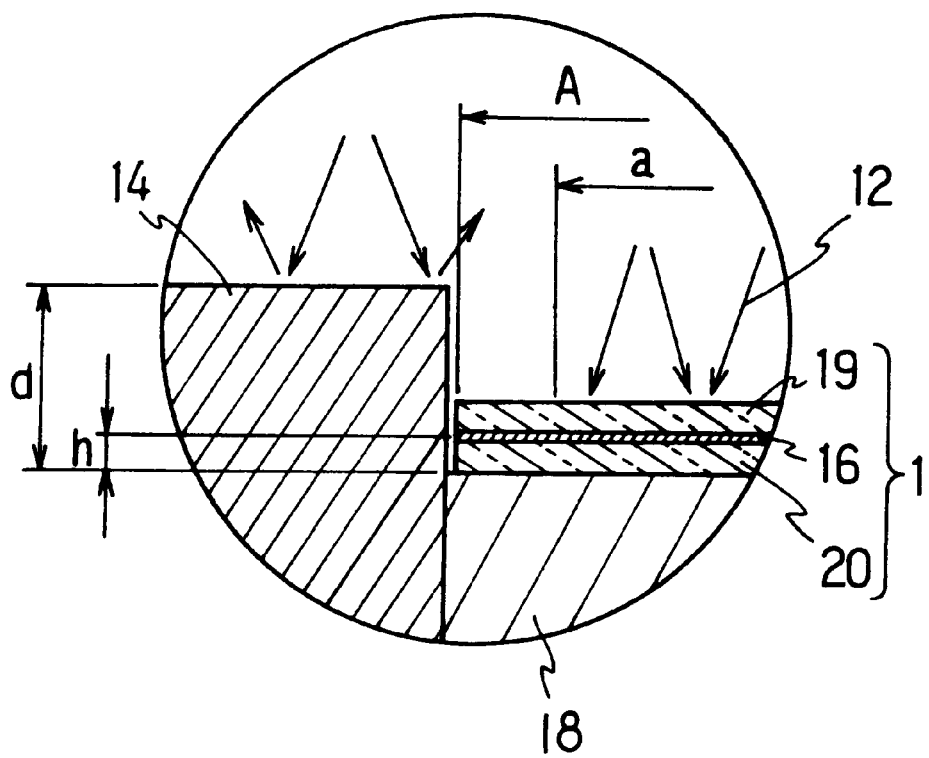
FIG. 2(a) is an enlarged cross-sectional view showing the details in a circle area designated by symbol "X" in FIG. 1 in an initializing operation of the optical recording medium by using the apparatus shown in FIG. 1.
Figure 2B:
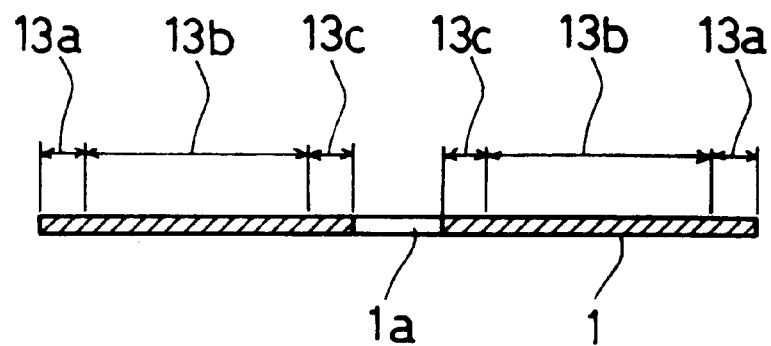
FIG. 2(b) is a cross-sectional view of an optical recording medium showing a relation of an outer peripheral region 13a, a recording region 13b and an inner peripheral region 13c on a surface of an optical recording medium 1

As can be seen from FIG. 2(b), an optical recording medium 1 which is initialized by the method or the apparatus of the first embodiment has a ring shape or a disc shape with a chuck hole 1a. An outer peripheral region (first region) 13a within a width of about 1–2 mm from an outer edge of the optical recording medium 1 and an inner peripheral region (third region) 13c within a width of about 10–15 mm from an inner edge of the hole 1a of the optical recording medium 1 are the margins on which data is not recorded. Thus, these regions are not necessarily initialized. On the other hand, a recording region (second region) 13b disposed between these regions is to be initialized for recording the data. Thus, it is necessary to initialize the recording region 13b.

An inner diameter of the frame 14 is larger within a predetermined tolerance than an outer diameter D of the optical recording medium 1. An outer diameter of the boss 15 is smaller within a predetermined tolerance than a diameter of the chuck hole 1a of the optical recording medium 1. Thus, when the optical recording medium 1 is mounted on the table 18, the optical recording medium 1 can hardly be moved. The optical recording medium 1 is positioned at a very high precision.

As can be seen from FIG. 2(a), the optical recording medium 1 comprises a transparent substrate 19, a multi-layer structure 16 including a protection layer, a recording layer and a reflection layer which are serially coated. And a surface protection layer 20 formed on the multi-layer structure 16. The substrate 19 is made of glass or resin such as polymethylmethacrylate, polycarbonate, or the like. The protection layer in the multi-layer structure 16 is made of nitrides such as SiN, AlN, oxides such as $TiO_2$, $SiO_2$, a sulfide such as ZnS, or a mixture such as ZnS—$SiO_2$. The recording layer in the multi-layer structure 18 is made of a phase transformation material such as a Ge—Sb—Te system or a magneto-optical material such as a Fe—Tb—Co system. The reflection layer in the multi-layer structure 16 is made of a metal element such as Au, Al, Ni, Cr or an alloy including one of these elements as a major element. The surface protection layer 20 is a resin layer coated on a surface of the reflection layer by a spin coating method, or a thin film made of the same material such as resin or glass as the material of the substrate 19 and adhered on the surface of the reflection layer by an adhesive.

The form of the completed optical recording medium includes both a single-sided recording medium and a double-sided recording medium. The single-sided recording medium has a configuration substantially the same as the above-mentioned configuration and the recording, reproducing and erasing of the data is operated from one side. The double-sided recording medium has a configuration such that two of the above-mentioned recording media are adhered with an adhesive directly or intervening a substrate in a manner so that the reflection layers of the recording media are facing each other. When the recording layer of the optical recording medium 1 is made of a magneto-optical material. Such as a Fe—Te—Co system, a magnetic field generator (not shown in the figure) is used for arranging the orientation of the magneto-optical material in the same direction.

As can be seen from FIG. 1, a light irradiation apparatus 100 comprises a flash lamp 4 and a driving circuit 17 connected to the terminals of the flash lamp 4 in parallel. An effective length "L" of the flash lamp 4 is longer than the diameter "D" of the optical recording medium 1. In FIG. 1, only one flash lamp 4 is illustrated. However, it is preferable that a plurality of flash lamps 4 are arranged in parallel corresponding to an area to be initialized, depending on the shape and number of optical recording media to be initialized at the same time. Alternatively, a spiral flash lamp can be used corresponding to an area to be initialized, depending on the shape and number of optical recording medium to be initialized at the same time. In other words, an area irradiated by the light irradiation apparatus 100 is necessary to be wider than the area of the surface of the optical recording medium 1 which is to be initialized.

The driving circuit 17 comprises a main capacitor 5 for accumulating an electric energy for discharging the flash lamp 4, an electric power supply 6 for charging the main capacitor 5, a switch 7 for switching of charge and for disconnection and discharge of surplus charge of the main capacitor 5, a trigger switch 8 for discharging between a cathode and an anode of the flash lamp 4, a trigger coil 9, and a trigger capacitor 10. A predetermined voltage Vtr is applied to the trigger capacitor 10 via a charging resister 11.

When the trigger switch 8 of the driving circuit 17 of the light irradiation apparatus 100 is closed, an electric charge accumulated in the trigger capacitor 10 is converted to an energy having a high frequency and a high voltage by the trigger coil 9, and applied to a trigger electrode of the flash lamp 4. Xenon gas in the flash lamp 4 is ionized by the energy having the high frequency and the high voltage. Thus, a discharge suddenly occurs between the cathode and the anode of the flash lamp 4. As a result, the electric energy accumulated in the main capacitor 5 is converted to a luminous energy. The flash lamp 4 instantaneously flashes. As a result, a flash light 12 irradiates the surface of the optical recording medium 1. For example, if a plurality of the flash lamps 4 are arranged in parallel, the flash light 12 is irradiated at random by the flash lamps 4.

An initializing operation of the apparatus is shown in FIG. 1. That is, the first embodiment of the method for initializing the optical recording medium of this invention is described.

At first, the disc shaped optical recording medium 1 is mounted on the table 18 of the holder 2. The depth of the hollow 3 (or the height of the frame 14 and the boss 15) is set to be deeper (or higher) than the thickness of the optical recording medium 1.

In comparison with surfaces of the frame 14 and the boss 15, the surface of the optical recording medium 1 is disposed farther from the flash lamp. In other words, the surface of the optical recording medium 1 is depressed in the hollow 3 from the surfaces of the frame 14 and the boss 15. On the other hand, the flash of light 12 includes not only a component perpendicularly irradiating the surface of the optical recording medium 1, but also a component obliquely irradiating the surface of the optical recording medium 1. Thus, as shown in FIG. 2(a), a part of the flash of light 12 obliquely irradiating the surface of the optical recording medium 1 is shaded by the frame 14 and the boss 15.

A quantity of incident light incident on a unit area of the recording layer in each of the outer periphery region 13a adjoining the frame 14 and the inner periphery region 13c adjoining the boss 15 is smaller than that in the recording region 13b disposed between these regions 13a and 13c. The recording region 13b which is most of the area of the optical recording medium 1 is initialized by receiving a sufficient luminous energy from the irradiation of the flash of light 12. However, when the recording region 13b is initialized, the outer peripheral region 13a and the inner peripheral region have not received a sufficient luminous energy to initialize the recording layer therein. Thus, most of the outer peripheral region 13a and the inner peripheral region 13c are not initialized, and the temperature rise in the multi-layer structure 16, specifically in the recording layer in the multi-layer structure 16, in these regions 13a and 13c is smaller. As a result, occurrence of cracks and corrugations in the multi-layer structure 16 in the outer peripheral region 13a and the inner peripheral region 13c of the optical recording medium 1 is minimized.

Figure 3A:
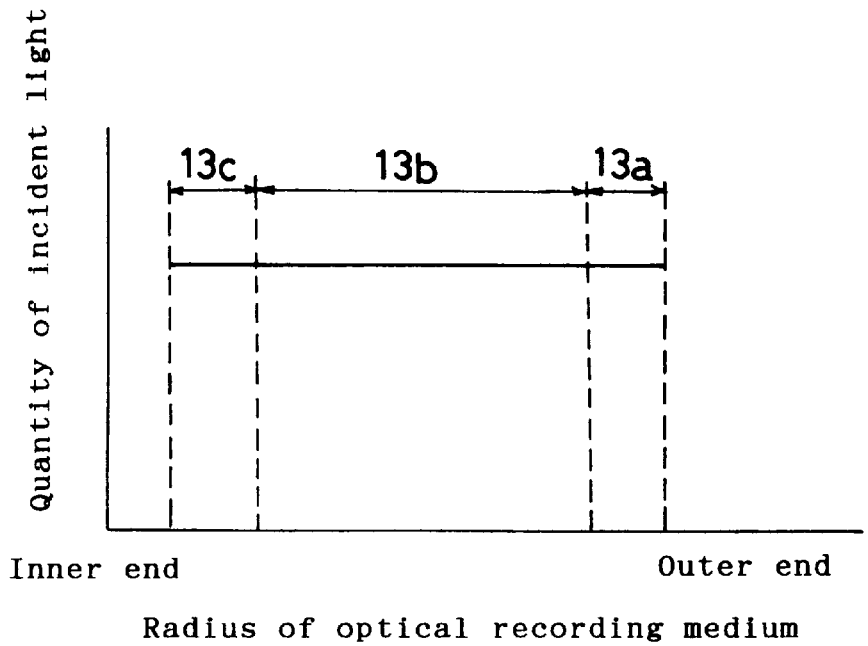
FIG. 3(a) is a graph showing a distribution of a quantity of incident light incident on a unit area of a surface of an optical recording medium in a radial direction thereof in a referential example.
Figure 3B:
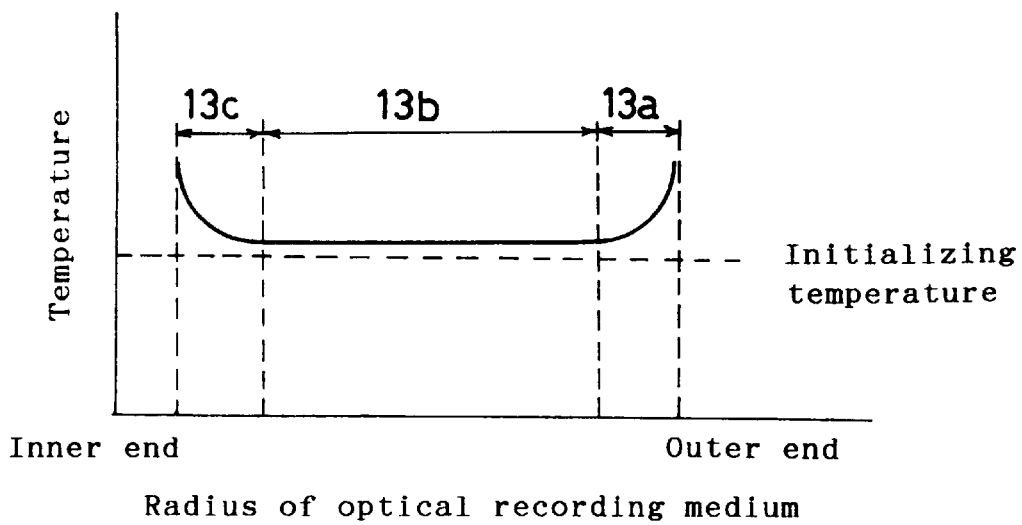
FIG. 3(b) is a graph showing a distribution of temperature at each measuring point of the optical recording medium in the radial direction in the referential example.

As a referential example, a flash of light 12 evenly irradiates the entire surface of an optical recording medium 1 when the holder 2 of the first embodiment is not used. The distribution of a quantity of incident light incident on a unit area of the recording layer of the optical recording medium 1 in a radial direction thereof is illustrated in FIG. 3(a). The distribution of temperature at each measuring point on the optical recording medium 1 in the radial direction is illustrated in FIG. 3(b).

Figure 3C:
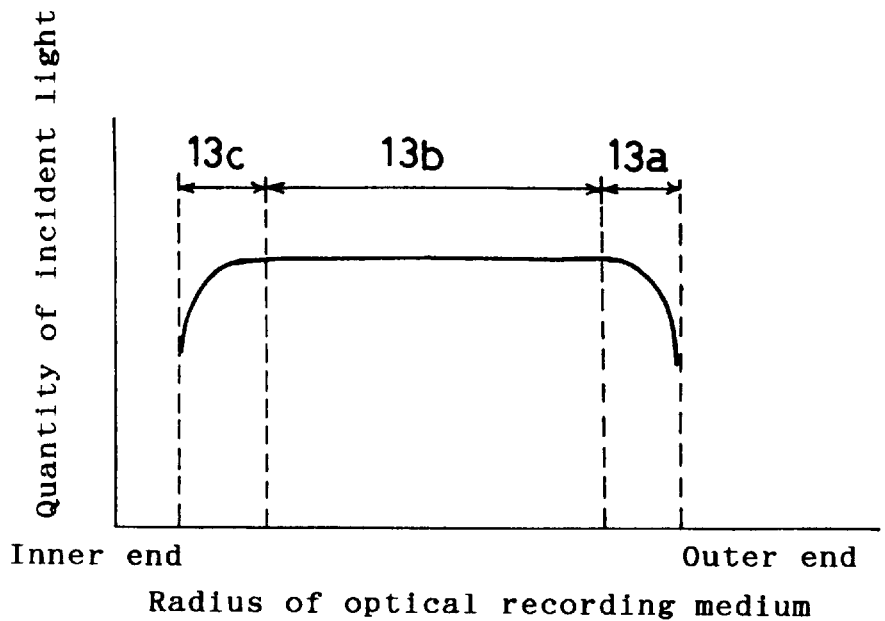
FIG. 3(c) is a graph showing a distribution of a quantity of incident light incident on a unit area of a surface of an optical recording medium in a radial direction thereof which is initialized by the apparatus in accordance with the first embodiment shown in FIG. 1.
Figure 3D:
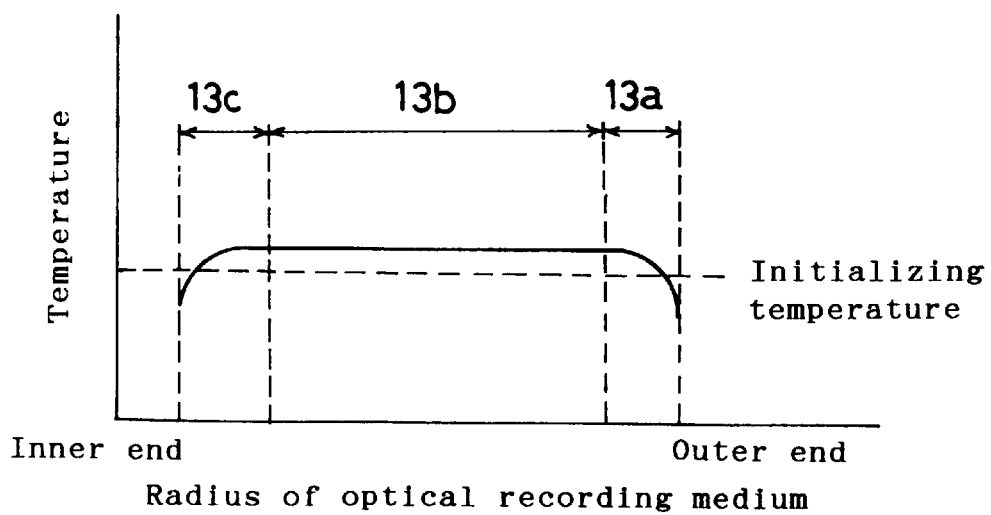
FIG. 3(d) is a graph showing a distribution of temperature at each measuring point of the optical recording medium in the radial direction which is initialized by the apparatus of the first embodiment of this invention shown in FIG. 1.

In comparison, the distribution a quantity of incident light incident on a unit area of the recording layer of the optical recording medium 1 which is initialized by the apparatus of this invention shown in FIG. 1 in a radial direction thereof is illustrated in FIG. 3(c). The distribution of temperature at each measuring point on the optical recording medium 1 which is initialized by the apparatus of this invention shown in FIG. 1 in the radial direction is illustrated in FIG. 3(d).

As can be seen from FIG. 3(a), when the optical recording medium in the referential example is initialized without using the holder 2 of the first embodiment, the surface of the optical recording medium 1 is evenly irradiated by the flash of light 12. The quantity of incident light incident on the unit area in each of the outer peripheral region 13a and in the inner peripheral region 13c is equal to the quantity of the incident light incident on the unit area in the recording region 13b. The flash of light 12 irradiating each unit area has a sufficient luminous energy to initialize the recording layer in each unit area of the optical recording medium 1. Thus, not only the temperature of the recording area in the recording region 13b, but also the temperature of the recording layer in each of the outer peripheral region 13a and the inner peripheral regions 13c suddenly increases by receiving the flash of light 12.

As mentioned in the description of the prior art, heat generated in the recording layer radiates in a circumference through the recording layer, the reflection layer, etc., in the multi-layer structure 16. The multi-layer structure 16, however, does not exist in the center chuck hole 1a and in the outside space near an outer edge of the optical recording medium 1. Thus, radiation of heat in the outer peripheral region 13a and the inner peripheral region 13c of the optical recording medium 1 is less than radiation of heat in the recording region 13b. As can be seen from FIG. 3(b) the temperature in the multi-layer structure 16 in each of the outer peripheral region 13a and the inner peripheral region 13c is higher than of the recording region 13b. Since the thermal load in the multi-layer structure 16 in each of the outer peripheral region 13a and the inner peripheral region 13c is larger, cracks and corrugations will occur in the multi-layer structure 16 in these regions 13a and 13c.

On the other hand. As can be seen from FIG. 3(c) the quantity of incident light incident on the unit area of the recording layer in the multi-layer structure 16 (hereinafter abbreviated as recording layer) in each of the outer peripheral region 13a and the inner peripheral region 13c of the optical recording medium 1 which is initialized by the apparatus of this invention shown in FIG. 1 is less than that in the recording region 13b. The luminous energy adjusting function of the holder 2 reduces the luminous energy due to the incident light or the quantity of incident light incident on the unit area of the recording layer in each of the outer peripheral region 13a and the inner peripheral region 13c.

When the flash of light 12 irradiates, the recording layer receives the luminous energy due to the incident light. The luminous energy is converted to a thermal energy in the recording layer. The flash of light 12 has a sufficient luminous energy so as to change an optical characteristic of the recording layer, for example an amorphous state to a crystallin state in each recording bit in the recording layer. Thus, the temperature in the recording layer in the recording region 13b suddenly increases due to the irradiation of the flash of light 12 to he higher than a predetermined initializing temperature of the recording layer.

However, the luminous energy due to the incident light or the quantity of incident light incident on the unit area of the recording layer in each of the outer peripheral region 13a and the inner peripheral region 13c is less than that in the recording region 13b by the luminous energy adjusting function of the holder 2. Thus, when the flash of light 12 irradiates, the temperature rise in the recording layer in each of the outer peripheral region 13a and the inner peripheral region 13c is small. As can be seen from FIG. 3(d), the temperature in the recording layer in each of the outer peripheral region 13a and the inner peripheral region 13c is less than the temperature in the recording region 13b, in spite of the intensity of the heat radiation. Thus, most of the recording layer in each of the outer peripheral region 13a and the inner peripheral region 13c is not initialized. Since the thermal load in the recording region in each of the outer peripheral region 13a and the inner peripheral region 13c is smaller, neither cracks nor corrugations are likely to occur in the recording layer in these regions 13a and 13c.

The outer peripheral region 13a and the inner peripheral region 13c of the optical recording medium 1 are the margins which are not used for recording the data. Thus, there is no problem, even when these regions 13a and 13c are not initialized.

The depth of the hollow 3 in the holder 2, that is, the height of the walls of the frame 14 and the boss 15 is now considered.

As mentioned above, with reference to FIG. 1, the position of the table 18 on which the optical recording medium 1 is mounted is adjustable with the height adjusting mechanism 21. By changing the position of the table 18, the height of the walls of the frame 14 and the boss 15 can be controlled. Furthermore, when the height of the walls of the frame 14 and the boss 15 is changed, widths of the outer peripheral region 13a and the inner peripheral region 13c of the optical recording medium 1 where the quantity of the incident light are restricted can be controlled.

In the first embodiment, the optical recording medium 1 has a disc shape. As shown in FIG. 2(a), when the height of the wall of the frame 14 is "d", the height from the surface of the table 18 to the multi-layer structure 16 in the optical recording medium 1 or a thickness of the surface protection layer 20 is "h", the radius of the optical recording medium 1 is "A", and the distance from the center to an outer end of the recording region (second region) 13b is "a", it is preferable to satisfy the following formula.

$$d \geq h + (A-a)$$

In a range of "d" satisfying the formula, the higher the height of the walls "d" becomes, the greater the amount of light shaded by the wall among the light obliquely irradiating the outer peripheral region 13a of the optical recording medium 1 becomes. The luminous energy adjusting function of the wall due to the frame 14 of the holder 2 becomes effective. The thickness "h" of the surface protection layer 20 and the radius "A" of the optical recording medium 1 are inherent and fixed. Thus, when the height "d" of the walls is merely made higher, there is a fear that the desired outer radius "a" of the recording region 13b cannot be obtained. For this reason, a condition similar to the above-mentioned formula is also required for a relation between the height of the boss 15 and width of the inner peripheral region 13c.

By using the apparatus for initializing the optical recording medium in accordance with the first embodiment of this invention shown in FIG. 1, the quantity of the incident light incident on the unit area of the recording layer in each of the outer peripheral region 13a and the inner peripheral region 13c of the optical recording medium 1 can be made less than that in the recording region 13b. Thus, the temperature rise in the recording layer in each of the outer peripheral region 13a and the inner peripheral region 13c of the optical recording medium 1 can be restricted, and the occurrence of cracks and corrugations in the recording layer in the outer peripheral region 13a and the inner peripheral region 13c can be minimized, and only the recording region 13b is initialized.

Figure 10:
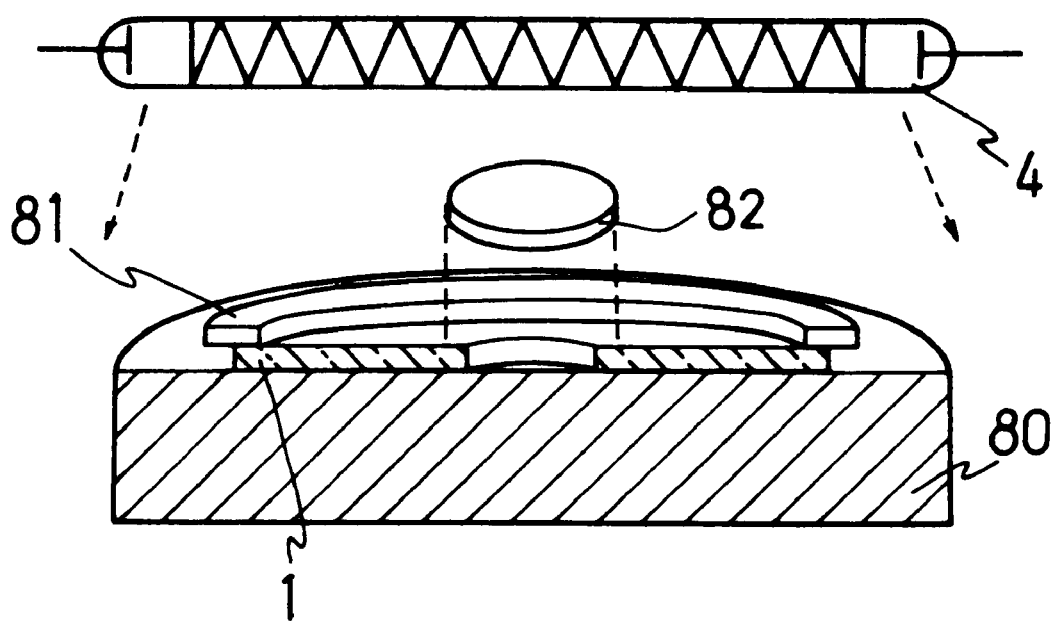
FIG. 10 is the cross-sectional view showing a configuration of a conventional apparatus for initializing the optical recording medium.

Furthermore, the use of the masks and the positioning of the masks in the conventional apparatus shown in FIG. 10 can be omitted, so that the time which is necessary for initializing the optical recording medium 1 can largely be shortened. Furthermore, since the initializing operation occurs when the flash of light 12 by the light irradiation apparatus 100 irradiates after mounting the optical recording medium 1 on the table 18 of the holder 2, optical recording medium 1 can be initialized in a short time.

In the first embodiment of the apparatus of this invention shown in FIG. 1, the heights of the frame 14 and the boss 15 are illustrated as the same, but the configuration of the apparatus is not restricted by the illustration. For example, when the width of the inner peripheral region 13c is wider than the outer peripheral region 13a, the height of the boss 15 is adjusted to be higher than the height of the frame 14, and vice versa.

Furthermore, in the above-mentioned first embodiment of the apparatus of this invention shown in FIG. 1, the frame 14 and the boss 15 are provided in the holder 2. However, the inner peripheral region 13c of the optical recording medium 1 is generally used as a margin for chucking the optical recording medium on a reproducing apparatus, so that an end of a region in which data is actually recorded is distant from the inner edge of the disc shaped optical recording medium 1. Thus, the boss 15 which is disposed at the center of the holder 2 can be omitted, if the occurrence of cracks and corrugations in the recording layer in the inner peripheral region 13c of the optical recording medium 1 is sufficiently small to be acceptable.

Furthermore, in the above-mentioned first embodiment, the optical recording medium 1 has a disc shape. However, the shape of the optical recording medium 1 is not restricted to the disc shape. When the optical recording medium 1 has a card shape, a sheet shape or a film shape, the cross-sectional shape of the frame 14 (and the boss 15, if necessary) of the holder 2 is (are) designed to engage with an outer edge (and an inner edge) of the optical recording medium 1.

SECOND EMBODIMENT

A second embodiment of a method and an apparatus for initializing an optical recording medium of this invention is described with reference to FIGS. 4 and 5.

Figure 4:
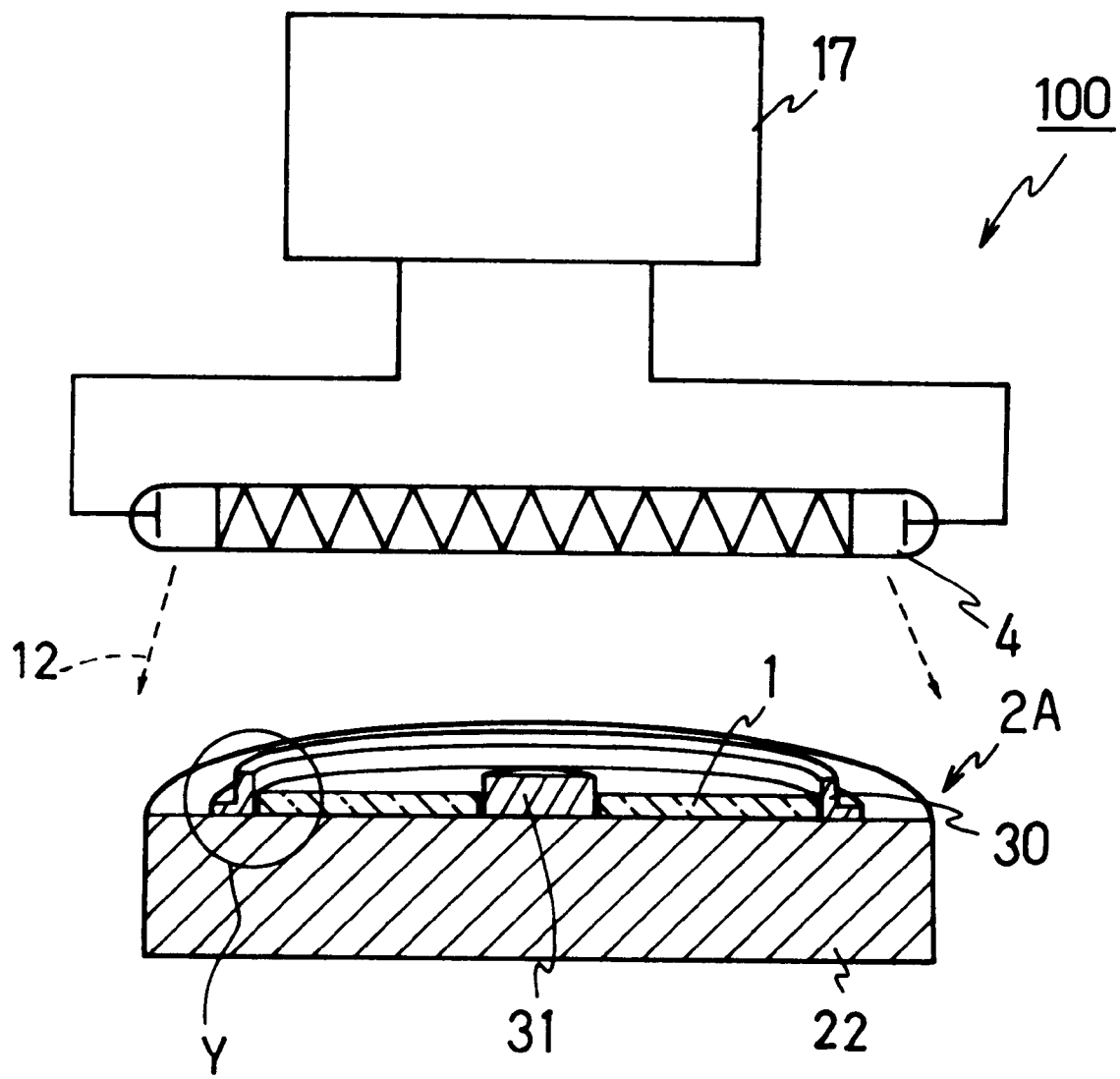
FIG. 4 is a partial cross-sectional and schematic illustration showing a configuration of a second embodiment of an apparatus for initializing an optical recording medium of this invention.

As can be seen from FIG. 4, a holder 2A comprises a flat table 22, a ring shaped frame 30 and a circular center boss 31. As discussed hereafter, the frame 30 and the boss 31 comprise a luminous energy adjuster. An optical recording medium 1 has a ring shape or a disc shape having a chuck hole. An inner diameter of the frame 30 is larger with a predetermined tolerance than an outer diameter of the optical recording medium 1. An outer diameter of the boss 31 is smaller with a predetermined tolerance than a diameter of the chuck hole of the optical recording medium 1. Thus, when the optical recording medium 1 is mounted on the table 22, the optical recording medium 1 can hardly be moved. The optical recording medium 1 is positioned at a very high precision.

A light irradiation apparatus 100 is substantially the same as that shown in FIG. 1, so that the details of the light irradiation apparatus 100 are not illustrated in FIG. 4. Furthermore, the initializing operation of the method in accordance with the second embodiment is substantially the same as that of the above-mentioned first embodiment, so that the explanation of the initializing operation is omitted.

With respect to the optical recording medium which is initialized by the apparatus shown in FIG. 4, the distribution of a quantity of incident light incident on a unit area of a surface of the optical recording medium 1 in a radial direction becomes substantially the same as that of the above-mentioned first embodiment shown in FIG. 3(c). The distribution of temperature at each measuring point on the optical recording medium in the radial direction becomes substantially the same as that of the above-mentioned first embodiment shown in FIG. 3(d).

Figure 5:
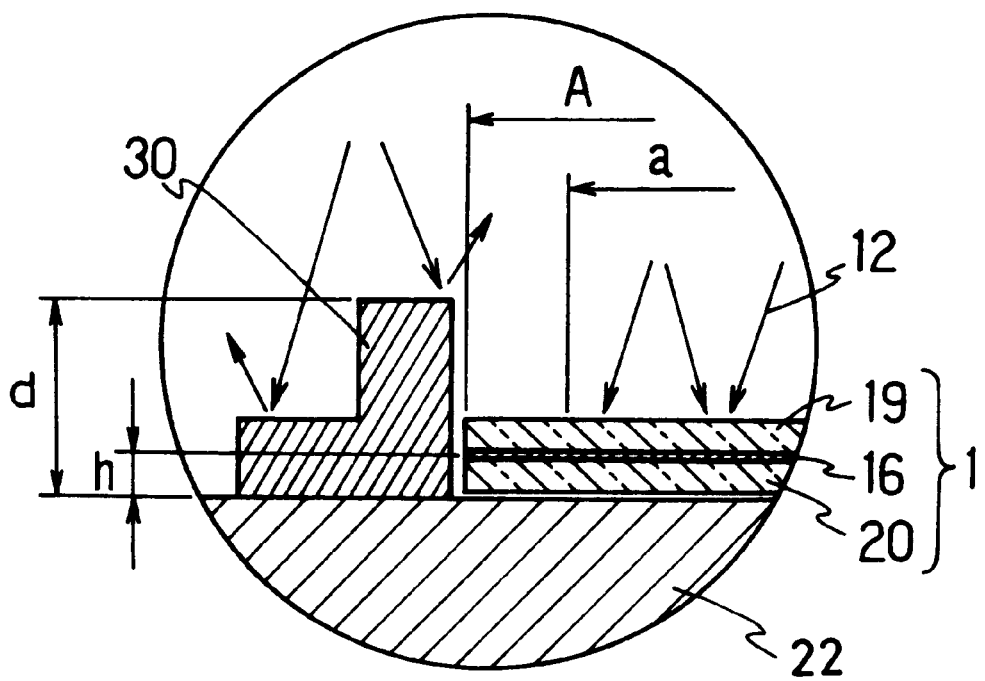
FIG. 5 is an enlarged cross-sectional view showing the details in a circle designated by symbol "Y" in FIG. 4 in an initializing operation of the optical recording medium by using the apparatus shown in FIG. 4.

As can be seen from FIGS. 4 and 5, the frame 30 adjoins an outer peripheral region 13a (shown in FIG. 2(b)) and the boss 31 adjoins an inner peripheral region 13c. The frame 30 and the boss 31 serve as the luminous energy adjuster for adjusting a luminous energy due to the incident light or a quantity of the incident light incident on the unit area in each of the outer peripheral region 13a and the inner peripheral region 13c of the optical recording medium 1. A part of a flash of light 12 from the light irradiation apparatus 100 is shaded by the frame 30 and the boss 31.

As can be seen from FIG. 3(c), the quantity of the incident light incident on the unit area of the recording layer in each of the outer peripheral region 13a and the inner peripheral region 13c of the optical recording medium 1 is less than that in the recording region 13b. Accordingly, as can be seen from FIG. 3(d), the temperature in the recording layer in each of the outer peripheral region 13a and the inner peripheral region 13c is lower than that in the recording region 13b. Thus, most of the recording layer in each of the outer peripheral region 13a and the outer peripheral region 13c is not initialized. Since the thermal load in the recording layer in each of the outer peripheral region 13a and the inner peripheral region 13c is smaller, neither cracks nor corrugations are likely to occur in the recording layer in these regions 13a and 13c.

The height of the walls due to the frame 30 and the boss 31 is now considered. By preparing a plurality of the frames 30 and the bosses 31 respectively to have different heights, a width of each of the outer peripheral region 13a and the inner peripheral region 13c of the optical recording medium 1 where the quantity of the incident light is restricted can be controlled.

In the second embodiment, the optical recording medium 1 has a disc shape. When the height of the wall due to the frame 30 is "d", the height from the surface of the table 22 to the multi-layer structure 16 in the optical recording medium 1 or the thickness of the surface protection layer 20 is "h", the radius of the optical recording medium 1 is "A", and the distance from the center to an outer end of the recording region (second region) 13b is "a", it is preferable to satisfy the following formula.

$$d \geq h + (A-a)$$

In a range of "d" satisfying the formula, the higher the height of the walls "d" becomes, the greater the quantity of the light shaded by the wall among the light obliquely incident on the outer peripheral region 13a of the optical recording medium 1 becomes. That is, the luminous energy adjusting function of the wall due to the frame 30 is effective. Since the thickness "h" of the surface protection layer 20 and the radius "A" of the optical recording medium 1 are inherent and fixed, when the height "d" of the walls is merely made higher, there is a concern that the desired outer radius "a" of the recording region 13b cannot be obtained. With respect to a relation between the height of the boss 31 and width of the inner peripheral region 13c, a condition similar to the above-mentioned formula is used.

In the second embodiment of the apparatus of this invention shown in FIG. 4, the heights of the frame 30 and the boss 31 are illustrated as the same, but the configuration of the apparatus is not restricted by the illustration. For example, when the width of the inner peripheral region 13c is wider than the outer peripheral region 13a. The height of the boss 31 is selected to be higher than the the height of the frame 30, and vice versa.

Furthermore, in the above-mentioned second embodiment of the apparatus of this invention shown in FIG. 4, the frame 30 and the boss 31 are provided in the holder 2A. However, the inner peripheral region 13c of the optical recording medium 1 is generally used as a margin for chucking the optical recording medium on a reproducing apparatus, so that an end of a region in which data is actually recorded is distant from the edge of the center chuck hole 1a of the optical recording medium 1. Thus, the boss 31 which is disposed at the center of the frame 30 of holder 2A can be omitted, if the occurrence of cracks and corrugations in the recording layer in the inner peripheral region 13c of the optical recording medium 1 is sufficiently small to be acceptable.

Furthermore, in the above-mentioned second embodiment, the optical recording medium 1 has a disc shape. However, the shape of the optical recording medium 1 is not restricted in the disc shape. When the optical recording medium 1 has a card shape, a sheet shape or a film shape, the cross-sectional shape of the frame 30 (and the boss 31 if necessary) of the holder 2A is (are) designed to engage with an outer edge (and an inner edge) of the optical recording medium 1.

THIRD EMBODIMENT

A third embodiment of a method and an apparatus for initializing an optical recording medium of this invention is described with reference to FIGS. 6(a), 6(b) and 7.

Figure 6A:
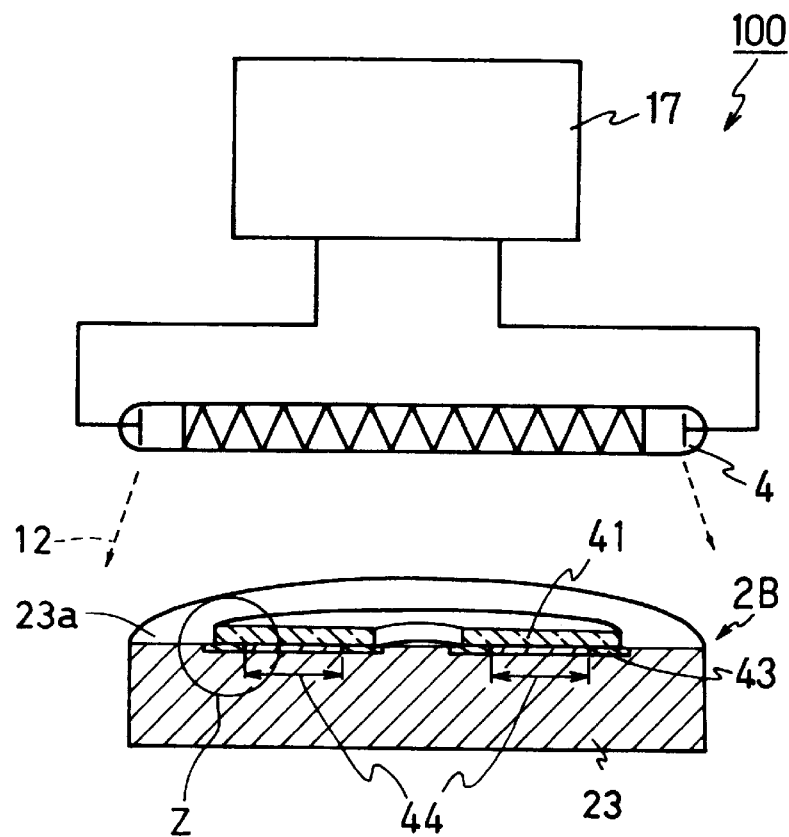
FIG. 6(a) is a partial cross-sectional and schematic illustration showing a configuration of a third embodiment of an apparatus for initializing an optical recording medium of this invention.
Figure 6B:
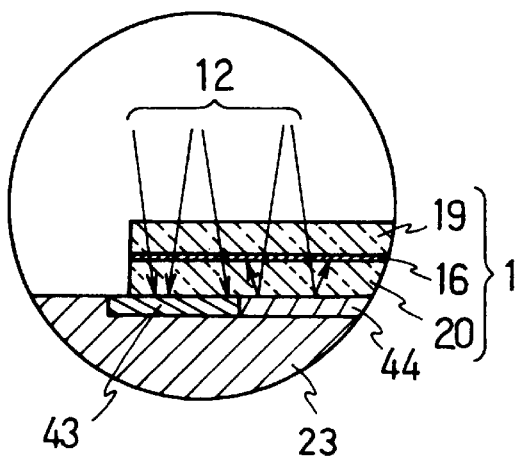
FIG. 6(b) is an enlarged cross-sectional view showing the details in a circle designated by symbol "Z" in FIG. 6(a) in an initializing operation of the optical recording medium by using the apparatus shown in FIG. 6(a)

As can be seen from FIG. 6(a). A holder 2B comprises a flat table 23, lower reflectance portions 43 and a higher reflectance portion 44 respectively formed on a surface of the table 23. As discussed hereafter, the lower reflectance portions 43 and the higher reflectance portion 44 comprise a luminous energy adjuster. Each of the lower reflectance portions 43 and the higher reflectance portion 44 has a ring shape corresponding to an outer peripheral region 13a, a recording region 13b and an inner peripheral region 13c of an optical recording medium 1. A light irradiation apparatus 100 is substantially the same as that shown in FIG. 1, so that the details of the light irradiation apparatus 100 is not illustrated in FIG. 6(a).

The lower reflectance portions 43 have a light reflectance lower than that of a solid surface of a material of the table 23. For example, when the table 23 is made of metal, the surface of the table 23 is oxidized to form a black colored metal oxide film. More specifically, when the material of the table 23 is aluminum, the surface of the table 23 is finished by a black alumite treatment. Alternatively, a black colored heat resisting paint can be spread on the surface of the table 23. Alternatively, the surface of the table 23 can be stain finished after a sand blasting treatment.

The higher reflectance portion 44 has a light reflectance higher than that of the solid surface of a material of the table 23. For example, when the table 23 is made of metal, the surface of the table 23 is finished to have a metallic luster by polishing, buffing or plating. Alternatively, when the table 23 is made of a material except metal, a mirror finished metal film can be adhered to the surface of the table 23.

The lower reflectance portions 43 are formed on portions of the surface 23a of the table 23 which face the outer peripheral region 13a and the inner peripheral region 13c when the optical recording medium 1 is mounted on the table 23. The higher reflectance portion 44 is formed on a portion on the surface 23a of the table 23 which faces the recording region 13b when the optical recording medium 1 is mounted on the table 23.

Operation of the third embodiment of the apparatus of this invention, that is, the third embodiment of the method for initializing the optical recording medium is now described.

As shown in FIG. 6(a), the optical recording medium 1 is mounted on the surface 23a of the table 23 of the holder 2B.

At this time, the outer peripheral region 13a and the inner peripheral region 13c are respectively positioned above the lower reflectance portions 43, and the recording region 13b is positioned above the higher reflectance portion 44. After that, a flash of light 12 irradiates the entire surface of the optical recording medium 1.

When a recording layer in the optical recording medium 1 is an alloy film of a Ge—Sb—Te system with a thickness of 20 nm, and a reflection layer is an Au film having a thickness of 10 nm, the transmittance of the optical recording medium 1 is about 50%. Thus, as can be seen from FIG. 6(b), substantially a half of the incident light of the flash of light 12 passes through a multi-layer structure 16 and a surface protection layer 20 of the optical recording medium 1, and reaches to the lower reflectance portions 43 and the higher reflectance portion 44 of the surface 23a of the table 23.

The light, which reaches to the higher reflectance portion 22, is reflected by the surface of the higher reflectance portion 22, re-enters into the optical recording medium 1 and is absorbed by a recording layer in the multi-layer structure 16 (hereinafter abbreviated as recording layer).

On the other hand, most of the light, which reaches the lower reflectance portions 43, is absorbed or diffused by the surface of the lower reflectance Portions 43. Thus, the light which reaches the lower reflectance portions 43 rarely re-enters into the optical recording medium 1.

As a result, a substantial quantity of the incident light incident on a unit area of the recording layer in the recording region 13b of the optical recording medium 1 located above the high reflectance portion 44 is disposed in a way different from that in each of the outer peripheral region 13a and the inner peripheral region 13c located above the lower reflectance portions 43. The temperature in the recording layer in each of the outer peripheral region 13a and the inner peripheral region 13c is lower than that in the recording region 13b. Thus, most of the recording layer in each of the outer peripheral region 13a and the inner peripheral region 13c is not initialized. Since the thermal load in the recording layer in each of the outer peripheral region 13a and the inner peripheral region 13c is smaller, neither cracks nor corrugations are likely to occur in the recording layer in these regions 13a and 13c.

Figure 7:
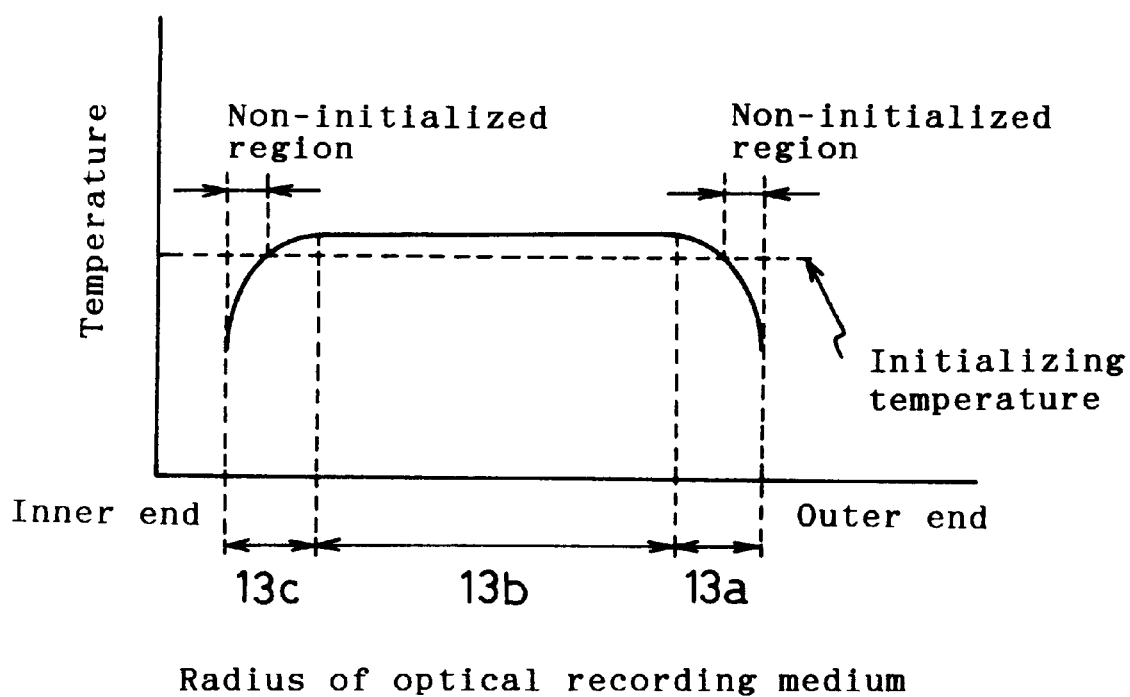
FIG. 7 is a graph showing a distribution of temperature at each measuring point of the optical recording medium in a radial direction thereof when a flash lamp 12 irradiates an entire surface of the optical recording medium by the apparatus of the third embodiment of this invention shown in FIG. 6(a)

With respect to the optical recording medium which is initialized by the apparatus shown in FIG. 6(a), a distribution of temperature at each measuring point on the optical recording medium in the radial direction is shown in FIG. 7. As can be seen from FIG. 7, the temperature in the recording layer in the recording region 13b of the optical recording medium 1 which is disposed above the higher reflectance portion 44 is higher than an initializing temperature. However, the temperature in the recording layer in each of the outer peripheral region 13a and the inner peripheral region 13c, especially in the vicinity of an outer edge or an inner edge of the optical recording medium 1 is lower than the initializing temperature.

The initializing operation of the optical recording medium 1 in the third embodiment is simply the irradiation of the optical recording medium 1 after mounting it on the table 23 of the holder 2B by the flash of light 12 by the light irradiation apparatus 100 after mounting the optical recording medium 1 on the table 23 of the holder 2B. Thus, a lot of the optical recording media 1 can be initialized effectively.

In the third embodiment, both of the lower reflectance portions 43 and the higher reflectance portion 44 are formed by surface finishing of the surface 23a of the table 23 of the holder 2B. However, alternative of the lower reflectance portions 43 and the higher reflectance portion 44 can be the solid surface of the material of the table 23, if the reflectance of the lower reflectance portions 43 is distinguishable from the reflectance of the higher reflectance portion 44.

FOURTH EMBODIMENT

A fourth embodiment of a method and an apparatus for initializing an optical recording medium of this invention is described with reference to FIGS. 8(a) and 8(b).

Figure 8A:
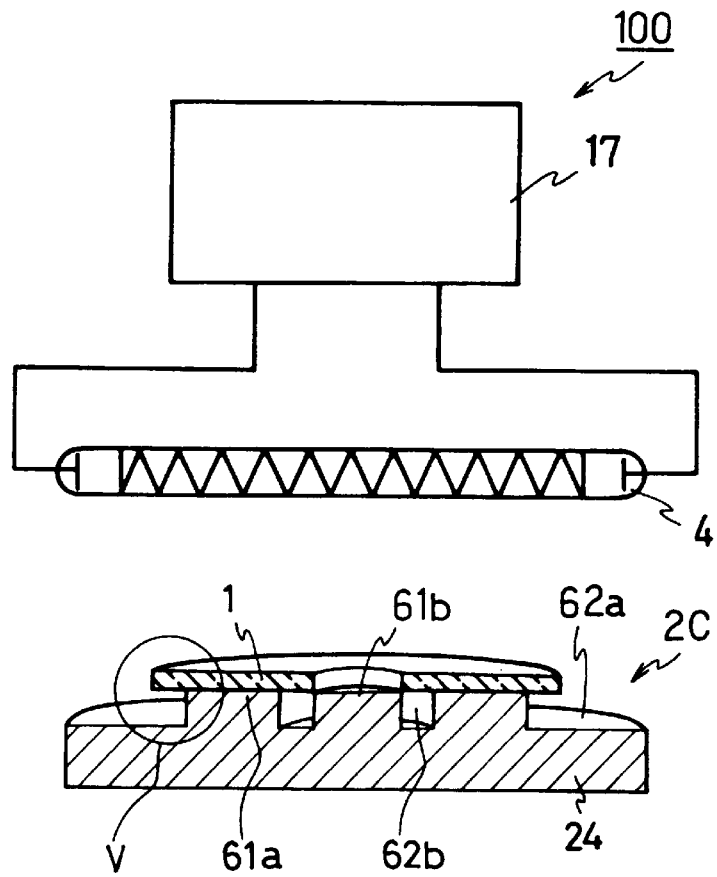
FIG. 8(a) is a partial cross-sectional and schematic illustration showing a configuration of a fourth embodiment of an apparatus for initializing an optical recording medium of this invention.
Figure 8B:
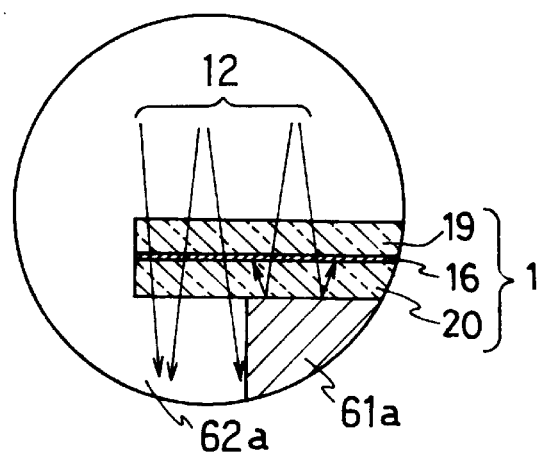
FIG. 8(b) is an enlarged cross-sectional view showing the details in a circle designated by symbol "V" in FIG. 8(a) in an initializing operation of the optical recording medium by using the apparatus shown in FIG. 8(a)

As can be seen from FIG. 8(a), a holder 2C comprises a flat table 24, a ring shaped protrusion 61a formed on the table 24 and a column shaped boss 61b formed on the table 24 and positioned at a center of the ring shape of the protrusion 61a. As discussed hereafter, the protrusion 61a and the boss 61b comprise a luminous energy adjuster. An optical recording medium 1 is held by the ring shaped protrusion 61a and the boss 61b. The ring shaped protrusion 61a corresponds to the recording region 13b of the optical recording medium 1 shown in FIG. 2(b). A hollow 62a formed outside the ring shaped protrusion 61a corresponds to an outer peripheral region 13a of the optical recording medium 1. A hollow 62b formed between the ring shaped protrusion 61a and the boss 61b corresponds to an inner peripheral region 13c of the optical recording medium 1.

It is preferable that the surface of the ring shaped protrusion 61a has a higher reflectance by mirror finishing, or the like. Furthermore, it is preferable that surfaces of the hollows 62a and 62b have a lower reflectance due to sand blasting, or the like. A light irradiation apparatus 100 is substantially the same as that shown in FIG. 1, so that the details of the light irradiation apparatus 100 are not illustrated in FIG. 8(a).

An operation of the fourth embodiment of the apparatus of this invention, that is, the fourth embodiment of the method for initializing the optical recording medium is now described.

As shown in FIG. 8(a), the optical recording medium 1 is mounted on the table 24 of the holder 2C. At this time, the outer peripheral region 13a and the inner peripheral region 13c are respectively positioned above the hollows 62a and 62b, and the recording region 13b is positioned above the ring shaped protrusion 61a. After that, a flash of light 12 irradiates the entire surface of the optical recording medium 1.

When a recording layer in a multi-layer structure 16 (hereinafter abbreviated as recording layer) in the optical recording medium 1 is an alloy film of a Ge—Sb—Te system having a thickness of 20 nm, and a reflection layer is an Au film having a thickness of 10 nm, transmittance of the optical recording medium 1 is about 50%. Thus, as can be seen from FIG. 8(b), substantially a half of the incident light of the flash of light 12 passes through the multi-layer structure 16 and a surface protection layer 20 of the optical recording medium 1, and reaches to the ring shaped protrusion 61a and the hollows 62a and 62b.

The light, which reaches to the ring shaped protrusion 61a is reflected by the surface of the ring shaped protrusion 61a, re-enters into the optical recording medium 1. And is absorbed by the recording layer.

On the other hand, the light, which reaches to the hollows 62a and 62b, directly enters into the hollows 62a and 62b, and becomes stray light. Most of the stray light in the hollows 62a and 62b is absorbed or diffused by the surfaces of the hollows 62a and 62b. Thus, the light which reaches to the hollows 62a and 62b rarely re-enters into the optical recording medium 1.

As a result, a substantial quantity of the incident light incident on a unit area in the recording layer in the recording region 13b of the optical recording medium 1 located above the ring shaped protrusion 61a is disposed of in a way different from that in each of the outer peripheral region 13a or the inner peripheral region 13c located above the hollows 62a and 62b. The temperature in the recording layer in each of the outer peripheral region 13a and the inner peripheral region 13c is lower than that in the recording region 13b. Thus, most of the recording layer in each of the outer peripheral region 13a and the inner peripheral region 13c is not initialized. Since the thermal load in the recording layer in each of the outer peripheral region 13a and the inner peripheral region 13c is smaller, neither cracks nor corrugations are likely to occur in the recording layer in these regions 13a and 13c.

With respect to the optical recording medium which is initialized by the apparatus shown in FIG. 8(a), a distribution of temperature at each measuring point on the optical recording medium in a radial direction is substantially the same as that in the above-mentioned third embodiment shown in FIG. 7.

The initializing operation of the optical recording medium 1 in the fourth embodiment is simply the irradiation of the optical recording medium 1 after mounting it on the table 24 of the holder 2C by the flash of light 12 of the light irradiation apparatus 100.

Figure 9A:
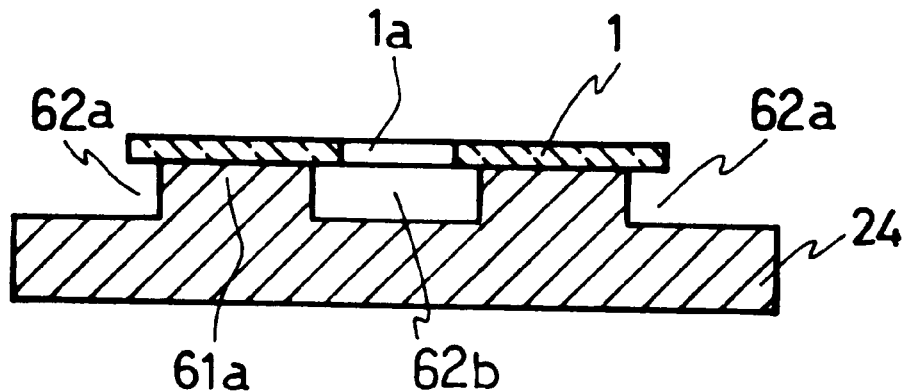
FIG. 9(a) is a cross-sectional view showing another configuration of the fourth embodiment of the apparatus for initializing the optical recording medium of this invention.
Figure 9B:
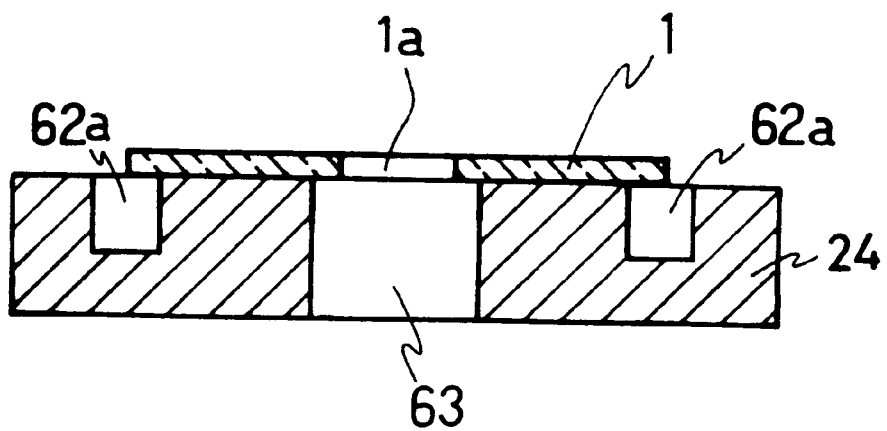
FIG. 9(b) is a cross-sectional view showing still another configuration of the fourth embodiment of the apparatus for initializing the optical recording medium of this invention.

Another configuration of the table 24 of the apparatus in the fourth embodiment is now described. As shown in FIG. 9(a), the table 24 has only the ring shaped protrusion 61a, and the boss 61b shown in FIG. 8(a) is omitted. Alternatively, as shown in FIG. 9(b), the center part of the ring shaped protrusion is a through hole 63.

The invention may be embodied in other specific forms without departing from the spirit and scope thereof. The embodiments are to be considered in all respects as illustrative and not restrictive. The scope of the invention is indicated by the appended claims rather than by the foregoing description, and all changes which come within the meaning and range of equivalency of the claims are intended to be embraced therein.

What is claimed is:

1. A method for initializing an optical recording medium having a recording layer in which an optical characteristic of the recording layer is changeable by irradiation of a light, comprising the steps of:

placing the optical recording medium on a holder, the holder comprising a luminous energy adjuster;

using the luminous energy adjuster to reduce a quantity of incident light incident on a unit area of the recording layer in a first region adjacent to an outer edge of the optical recording medium less than a quantity of incident light incident on a unit area of a second region disposed inside the first region of the optical recording medium; and irradiating with a flash lamp a surface of the optical recording medium opposite that surface in contact with the holder to initialize the recording layer in the second region, the optical recording medium positioned between the holder and the flash lamp, wherein the luminous energy adjuster includes a first wall protruding toward the flash lamp along an outer edge of the optical recording medium, wherein the first wall has a height higher than a thickness of the optical recording medium so that obliquely incident light incident on a unit area along the outer edge of the recording medium is reduced.

2. The method for initializing the optical recording medium in accordance with claim 1, wherein the luminous energy adjuster further reduces a quantity of incident light incident on a unit area of a third region adjacent to an inner edge of the optical recording medium to be less than that in the second region.

3. The method for initializing the optical recording medium in accordance with claim 2, wherein the luminous energy adjuster includes a second wall protruding toward the flash lamp along an inner edge of the optical recording medium, wherein the second wall has a height higher than a thickness of the optical recording medium so that obliquely incident light incident on a unit area along the inner edge of the recording medium is reduced.

4. An apparatus for initializing an optical recording medium having a recording layer in which an optical characteristic of the recording layer is changeable by irradiation of a light comprising:

a holder for holding the optical recording medium on its surface;

a luminous energy adjuster for reducing a quantity of incident light incident on a unit area of the recording layer in a first region adjacent to an outer edge of the optical recording medium less than a quantity of incident light incident on a unit area of the recording layer in a second region disposed inside the first region of the optical recording medium; and a light source for irradiating a flash of light to a surface of the optical recording medium opposite that surface in contact with the holder, wherein the luminous energy adjuster includes a first wall protruding toward the light source along an outer edge of the optical recording medium, wherein the first wall has a diameter greater than that of the optical recording medium and a height higher than a thickness of the optical recording medium so that obliquely incident light incident on a unit area along the outer edge of the recording medium is reduced.

5. The apparatus for initializing an optical recording medium in accordance with claim 4, wherein the recording layer further includes a third region inside the second region and adjacent to the second region, the luminous energy adjuster further reducing a quantity of incident light incident on a unit area of the recording layer in the third region to be less than that in the second region.

6. The apparatus for initializing an optical recording medium in accordance with claim 5, wherein the luminous energy adjuster includes a second wall protruding toward the light source along an inner edge of the optical recording medium, wherein the second wall has a height higher than a thickness of the optical recording medium so that obliquely incident light incident on a unit area along the inner edge of the recording medium is reduced.

7. The apparatus for initializing an optical recording medium in accordance with claim 6, wherein the height of one of the first and second walls is "d", a height from the surface of a table upon which the first and second walls rest to the recording layer in the optical recording medium is "h", a distance from the center to the outer edge of the optical recording medium is "A", and a distance from the center to an outer end of the second region to be initialized of the optical recording medium is "a", the following formula is satisfied:

$$d \geq h + (A - a).$$

8. An apparatus for initializing an optical recording medium having a recording layer in which an optical characteristic of the recording layer is changeable by irradiation of a light comprising:

a holder for holding the optical recording medium on its surface;

a luminous energy adjuster for reducing a quantity of incident light incident on a unit area of the recording layer in a first region adjacent to an outer edge of the optical recording medium less than a quantity of incident light incident on a unit area of the recording layer in a second region disposed inside the first region of the optical recording medium; and a light source for irradiating a flash of light to a surface of the optical recording medium opposite that surface in contact with the holder, wherein the holder comprises a flat table and the luminous energy adjuster comprises a frame coupled with the table and having an inner periphery engaged with the outer edge of the optical recording medium, the height of the frame being higher than the thickness of the optical recording medium.

9. The apparatus for initializing an optical recording medium in accordance with claim 8, wherein the luminous energy adjuster further comprises a boss disposed at the center of the frame, and the height of the boss being higher than the thickness of the optical recording medium.

10. An apparatus for initializing an optical recording medium having a recording layer in which an optical characteristic of the recording layer is changeable by irradiation of a light comprising:

a holder for holding the optical recording medium on its surface;

a luminous energy adjuster for reducing a quantity of incident light incident on a unit area of the recording layer in a first region adjacent to an outer edge of the optical recording medium less than a quantity of incident light incident on a unit area of the recording layer in a second region disposed inside the first region of the optical recording medium; and a light source for irradiating a flash of light to a surface of the optical recording medium opposite that surface in contact with the holder, wherein the recording layer further includes a third region inside the second region and adjacent to the second region, the luminous energy adjuster further reducing a quantity of incident light incident on a unit area of the recording layer in the third region to be less than that in the second region, and wherein the luminous energy adjuster comprises a tube shaped frame, a boss disposed at the center of the tube shaped frame and a table which engages with an inner periphery of the frame and an outer periphery of the boss and is movable along the boss.

11. An apparatus for initializing an optical recording medium having a recording layer in which an optical characteristic of the recording layer is changeable by irradiation of a light comprising:

a holder for holding the optical recording medium on its surface;

a luminous energy adjuster for reducing a quantity of incident light incident on a unit area of the recording layer in a first region adjacent to an outer edge of the optical recording medium less than a quantity of incident light incident on a unit area of the recording layer in a second region disposed inside the first region of the optical recording medium; and a light source for irradiating a Hash of light to a surface of the optical recording medium opposite that surface in contact with the holder, wherein the luminous energy adjuster includes a wall protruding toward the light source along an outer edge of the optical recording medium, wherein the wall has a height higher than a thickness of the optical recording medium so that obliquely incident light incident on a unit area along the outer edge of the recording medium is reduced, said luminous energy adjuster including a height adjusting mechanism for adjusting the height of the wall.

12. The apparatus for initializing an optical recording medium in accordance with claim 11, wherein the luminous energy adjuster comprises a tube shaped frame and a table which engages with an inner periphery of the frame and is movable along a center axis of the frame.

13. The apparatus for initializing an optical recording medium in accordance with claim 12, wherein the height of the wall is "d", a height from the surface of the table to the recording layer in the optical recording medium is "h", a distance from the center to the outer edge of the optical recording medium is "A", and a distance from the center to an outer end of the second region to be initialized of the optical recording medium is "a", the following formula is satisfied.

$$d \geq h + (A - a)$$

14. An apparatus, comprising:

an optical recording medium having a recording layer in which an optical characteristic of the recording layer is changeable by irradiation of a light;

a holder for holding the optical recording medium on its surface;

a luminous energy adjuster for reducing a quantity of incident light incident on a unit area of the recording layer in a first region adjacent to an outer edge of the optical recording medium less than a quantity of incident light incident on a unit area of the recording layer in a second region disposed inside the first region of the optical recording medium, said recording layer including a third region inside the second region and adjacent to the second region, said luminous energy adjuster reducing a quantity of incident light incident on a unit area of the recording layer in the third region to be less than that in the second region, said luminous energy adjuster including a height adjusting mechanism for adjusting the height of the first and second walls; and a light source for irradiating a flash of light to a surface of the optical recording medium opposite that surface in contact with the holder, said luminous energy adjuster including a first wall protruding toward the light source along an outer edge of the optical recording medium, said first wall having a height higher than a thickness of the optical recording medium so that obliquely incident light incident on a unit area along the outer edge of the recording medium is reduced, said luminous energy adjuster including a second wall protruding toward the light source of the light source along an inner edge of the optical recording medium, said second wall having a height higher than a thickness of the optical recording medium so that obliquely incident light incident on a unit area along the inner edge of the recording medium is reduced, wherein said optical recording medium can be initialized.

* * * * *